W. Williams.

Boot and Shoe Insole.

No. 3,944. Reissued Apr. 26, 1870.

Witnesses:

R. T. Davis

Dunn Pantzorkis

Inventor:

Wm. Williams

By J. Fraser & Co

Attorneys

United States Patent Office.

WILLIAM WILLIAMS, OF ROCHESTER, NEW YORK.

*Letters Patent No.* 89,105, *dated April* 20, 1869; *reissue No.* 3,944, *dated April* 26, 1870.

IMPROVED INSOLE FOR BOOTS AND SHOES.

The Schedule referred to in these Letters Patent and making part of the same

*To all whom it may concern:*

Be it known that I, WILLIAM WILLIAMS, of the city of Rochester, in the county of Monroe and State of New York, have invented a certain new and useful Improvement in Insoles for Boots and Shoes; and I do hereby declare that the following is a full and exact description of the same, reference being had to the accompanying drawings, in which—

Figure 1:
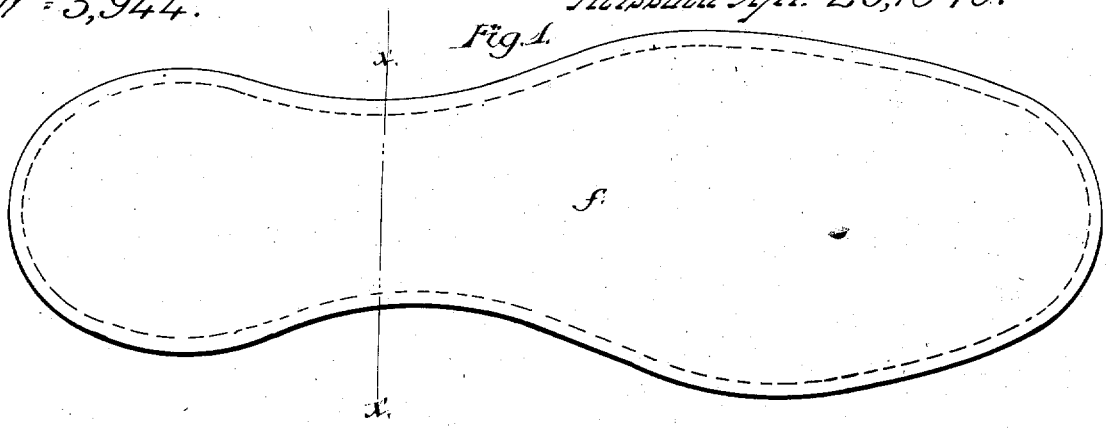

Figure 1 is a flat view of the insole, complete.

Figure 2:
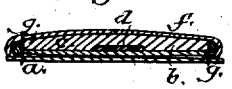

Figure 2, a cross-section in plane *x x*.

Figure 3:
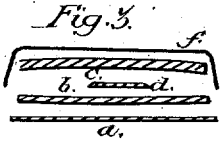

Figure 3, a similar view, with the parts separated.

*Nature of the Invention.*

This invention consists of an insole composed of felt, cloth, and paper, arranged substantially as hereinafter described.

Also, an insole-stiffener, which allows the free bending of the same, while it serves to prevent wrinkling and rupture at that point.

*General Description.*

In the drawings—

*a* represents the bottom layer, which is made of thin paper, and has, on the under side, a water-proof coat, such as oil-paint or India-rubber preparation;

*b* is a piece of pasteboard; and

*c*, a piece of felted hair, both cut of the form of the sole.

*f* is the overlying covering of cloth, which forms the top of the sole.

*d* is the shank-piece, consisting of a strip of oiled wood or its equivalent, placed within the sole, and made of much flexibility, so as to allow the easy bending of the sole at that point.

These parts are placed together in the following manner: first, the bottom piece *a*, with the pasteboard contiguous thereto, with a felted layer placed between the pasteboard and a cloth covering, this layer of cloth preferably encircling the edge of a portion or the whole of the other parts.

The fabric of layers thus completed is then stitched, as shown at *g*, by means of a sewing-machine or otherwise.

An important advantage in my improved insole is the employment of the pasteboard *b*, arranged as above shown and described, of the form and size of the sole, and serving as a stiffener to keep the sole in shape; at the same time it offers the greatest flexibility and ease to the foot, and presents no inequalities to the tread.

The pasteboard stiffener is cheap, easily applied, presents a flat surface, presents no impediment in the sewing, and combines with the felt and cloth in producing a soft, flexible, and elastic surface to the foot. If wet, it does not become injured, as would be the case with wood, if used as a stiffener, and leather is too expensive and lacks stiffness.

The flexible shank-piece *d*, placed in the shank of the insole, takes the strain that comes at that point, and, therefore, prevents rupture and tear. It also prevents the longitudinal wrinkling that would otherwise occur, especially where pasteboard is used as a stiffner. It also serves to stay or stiffen the insole in drawing the foot out of the boot. It has a special advantage in this relation, as otherwise the great flexibility and yieldingness of the sole would cause it to bend and roll up.

Steel springs, such as are used between the heavy soles of boots and shoes, would not answer in this relation, owing to their stiffness, and also to their tendency to corrosion and rust, and, furthermore, for the reason that coming so closely in contact with the feet, they would be cold and uncomfortable.

What I claim as my invention, and desire to secure by Letters Patent, is—

1. The insole, consisting of the bottom piece *a*, with the pasteboard contiguous thereto, in combination with the covering *f* and a felted layer interposed between said covering and the pasteboard, substantially as described.

2. For the purpose of an insole-stiffener, the flexible shank-piece *d* or its equivalent, applied substantially as described.

WILLIAM WILLIAMS.

Witnesses:

R. F. OSGOOD,

CHAS. F. SPENCER.